Figure 1:
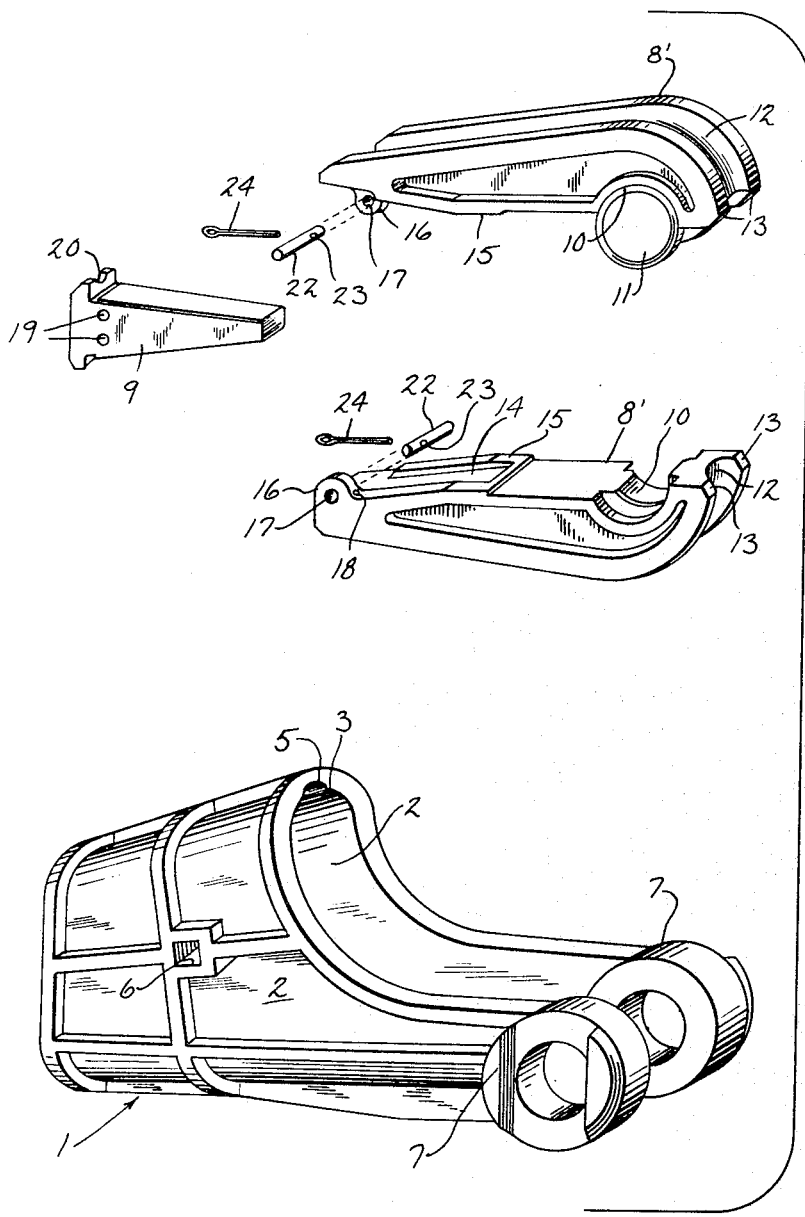

Aug. 15, 1967  J. BAER  3,335,470
COLLAPSIBLE WEDGE FOR CABLE CONNECTION
Filed Nov. 23, 1965  3 Sheets-Sheet 1

INVENTOR
JOSEF BAER

BY Allan W. Leiser

ATTORNEY

Aug. 15, 1967  J. BAER  3,335,470
COLLAPSIBLE WEDGE FOR CABLE CONNECTION
Filed Nov. 23, 1965  3 Sheets-Sheet 2

INVENTOR
JOSEF BAER

BY Allan W. Reiser

ATTORNEY

Aug. 15, 1967    J. BAER    3,335,470
COLLAPSIBLE WEDGE FOR CABLE CONNECTION
Filed Nov. 23, 1965    3 Sheets-Sheet 3

INVENTOR
JOSEF BAER

BY *Allan W. Leiser*

ATTORNEY

United States Patent Office 3,335,470
Patented Aug. 15, 1967

3,335,470
COLLAPSIBLE WEDGE FOR CABLE CONNECTION
Josef Baer, South Milwaukee, Wis., assignor to Bucyrus-Erie Company, Milwaukee, Wis., a corporation of Delaware
Filed Nov. 23, 1965, Ser. No. 509,312
7 Claims. (Cl. 24—126)

This invention relates to cable connections, and more specifically to anchor connections of the type used, for example, to attach the drag cable to the bucket of a dragline excavator. The invention resides more specifically in a wedge assembly for a cable anchor clamp, which wedge assembly is collapsible to allow for easy removal and replacement of extremely heavy and inflexible cables.

Conventional cable anchor clamps include a tapered sleeve-like socket and a solid wedge. The cable to be anchored is passed through the small end of the socket and looped about the large end of the wedge which is then inserted into the end of the socket. Tension on the live end of the cable causes the wedge to be pulled tightly into the socket, preventing the cable from being pulled loose.

The usual clamp is suitable enough for small flexible cables, but is not satisfactory for the extremely heavy cables used on modern excavators. The drag cable or cables of a large dragline, for example, may be four inches in diameter or more, and it will be apparent that a cable of this size is very stiff and difficult to handle. If such a cable is anchored by means of a conventional clamp and then subjected to the tremendous tension for which it is designed, the wedge is drawn so tightly into the socket that it is extremely difficult to free it for replacement of the cable. Cables must be replaced rather frequently, every month or so in many applications. Heretofore, it has been necessary for each replacement of a large cable to remove the entire clamp and transport it to a shop where the wedge can be free by means of a hydraulic press or ram. Obviously, this procedure results in considerable expense, inconvenience and downtime.

It is the general object of this invention to provide a collapsible wedge assembly for a cable clamp which allows for relatively easy on-the-job removal and replacement of even extremely heavy, stiff cables.

It is another object of the invention to provide a wedge assembly that is easily collapsible even when wedged tightly in place, but that provides a secure anchor and that is not subject to accidental failure.

It is a further object of the invention to provide a wedge assembly utilizing a minimum number of parts that is strong and durable while being relatively simple and inexpensive to manufacture and use.

Other objects and advantages will appear from the description to follow. In the description, reference is made to the accompanying drawings, which form a part hereof, in which there is shown, by way of illustration and not of limitation, a preferred embodiment of the invention.

Figure 2:
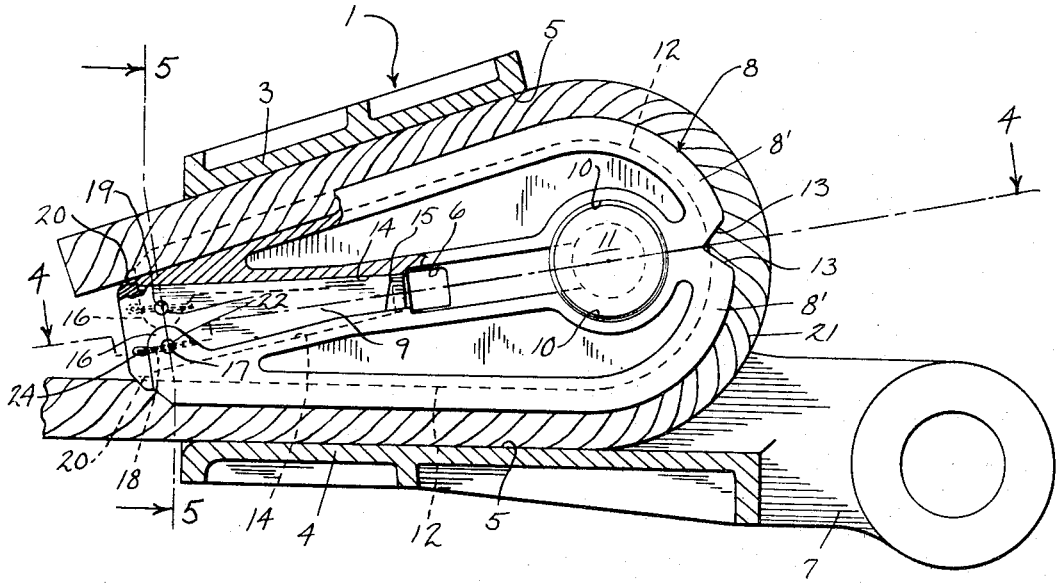
Figure 3:
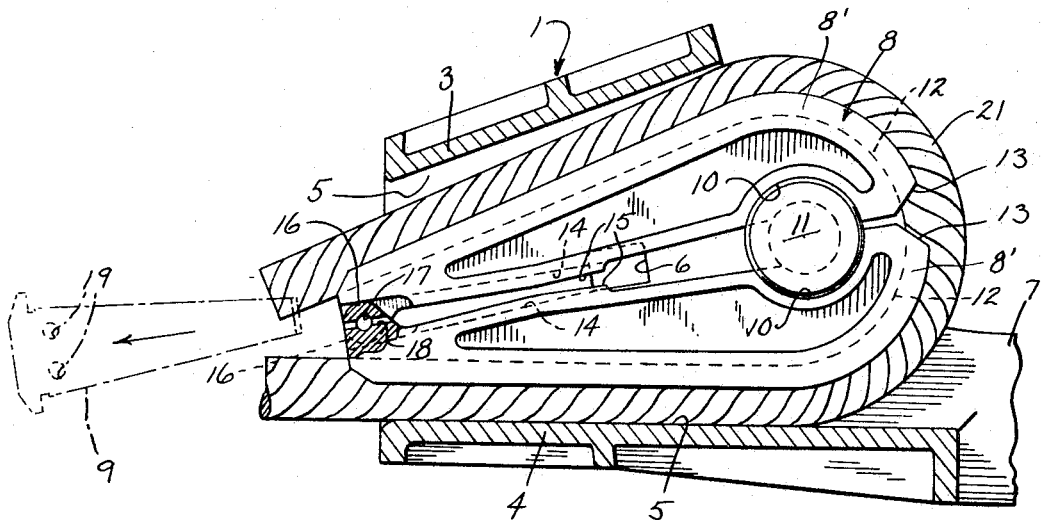
Figure 4:
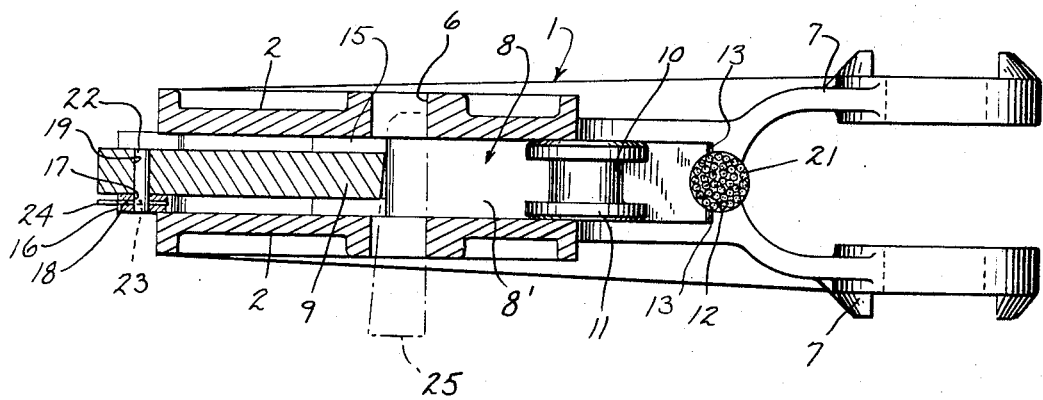
Figure 5:
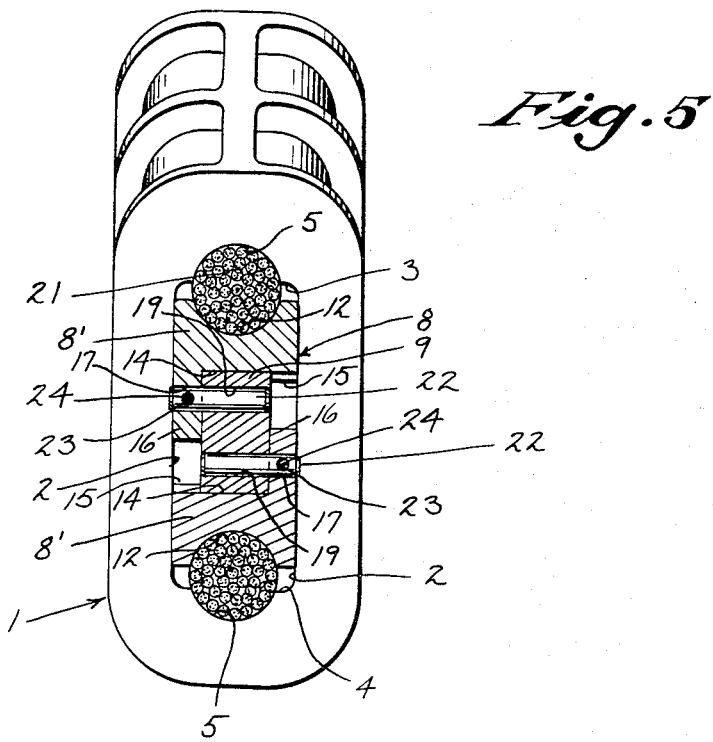

In the drawings:

FIG. 1 is an exploded view in perspective of a cable clamp including a collapsible wedge assembly formed according to this invention, FIG. 2 is a view in elevation, with parts broken away and in cross section, showing the clamp of FIG. 1 in operative position, FIG. 3 is a view similar to FIG. 2, but showing the wedge assembly collapsed, FIG. 4 is a view in cross section along the plane 4—4 shown in FIG. 2, and FIG. 5 is a view in cross section along the plane 5—5 shown in FIG. 2.

The clamp shown in the drawings includes a tapered, sleeve-like socket 1 which has substantially parallel vertical side walls 2, a rounded top wall 3 and a bottom wall 4. The top and bottom walls 3 and 4 are convergent from rear to front, from right to left as seen in FIG. 2 to give the socket 1 its tapered configuration, and are both provided along their inner surfaces with semicyclindrical cable receiving grooves 5. The side walls 2 are provided with aligned release openings 6 which are adapted to receive a release key as will be described. Extending to the rear of the socket 1 are a pair of apertured arms 7 by means of which it can be pinned to a drag bucket or other support in conventional fashion.

Disposed within the socket 1 when the clamp is in use, as seen in FIG. 2, is a tapered wedge 8 which comprises two identical facing wedge halves 8', seen most clearly in FIG. 1. A generally T-shaped tapered spreader 9 is disposed btween the wedge halves 8' in use, and has an oblique inner end that extends into the line of the openings 6.

The wedge halves 8' are provided with rearwardly disposed facing stepped semicylindrical seats 10 which together receive a spool 11 that serves as a pivotal connection between the halves 8'. In practice, it is preferred to have the spool 11 welded to one of the wedge halves 8', but this still allows for the desired pivotal movement. The outer surfaces of the wedge halves 8' are provided with semicylindrical cable receiving grooves 12. The facing rearmost edges of the wedge halves 8' are cut away at 13 to define a notch useful for separating a cable as will be described.

When the wedge 8 is in the operative position of FIG. 2, the facing surfaces of the wedge halves 8' immediately forward of the spool 11 are spaced apart and generally parallel. Beginning approximately midway of the lengths of the wedge halves 8', however, their facing inner surfaces are inclined away from each other to form divergent wedge surfaces 14 between which the spreader 9 is received. Outlining the wedge surface 14 of each half 8' is an outwardly opening, generally U-shaped upstanding rim 15. At the end of one leg of the rim 15 is an upstanding ear 16 provided with a transverse lock pin opening 17 and a cotter pin bore 18 that is parallel to the length of the wedge half 8' and that is transverse to and extends across the opening 17.

The spreader 9 is tapered to mate with the wedge surfaces 14. Near its head, it is provided with a pair of vertically spaced transverse lock pin openings 19. Preferably, both ends of the head of the spreader 9 are provided with cable receiving grooves 20.

In FIGS. 2–4, the clamp is shown in operative position anchoring a large cable 21 which has both its live and dead ends extending outwardly through the smaller end of the socket 1. The wedge 8 is largely disposed within the socket 1, the cable 21 extending about the larger end thereof and being received in the grooves 5, 12 and 20.

In operative position, the spreader 9 is received between and engages the wedge surfaces 14 to hold the wedge halves 8' apart. The upper and lower surfaces of the spreader 9 are received within the rims 15 of the upper and lower wedge halves 8', respectively, the rims 15 thus serving to hold the spreader 9 against lateral movement and to limit its inward movement with respect to the wedge 8. As can be seen most clearly in FIG. 5, the ears 16 are laterally and vertically spaced and lie on opposite sides of the spreader 9 with their lock pin openings 17 in alignment with respective spreader lock pin openings 19.

To lock the spreader 9 in place, a pair of lock pins 22 are passed through the aligned openings 17 and 19. The lock pins 22 are provided with transverse cotter pin openings 23 which are in alignment with the cotter pin bore 18 when the pins 22 are in place. Cotter pins 24 are placed through the bores 18 and openings 23 to lock the pins 22 in place.

With all elements in position, the wedge 8 is essentially one solid piece, and it will be apparent that tension on the live end of the cable 21 will cause the wedge 8 to be pulled tightly into the socket 1 so that the cable 21 cannot be pulled loose.

When the cable 21 is to be replaced the socket 1 can be left in place or removed from the machine. The cotter pins 24 and the lock pins 22 are first removed to free the spreader 9. A release key 25, shown in broken lines in FIG. 4, is then inserted through one of the release openings 6 and engages the oblique end of the spreader 9. Driving the key 25 upwardly as seen in FIG. 4 will of course cause the spreader 9 to be moved to the left or outwardly with respect to the wedge halves 8'. After only slight movement outwardly, the spreader 9 will have been freed sufficiently so that it can be pulled out from between the wedge halves 8'. The grooves 20 make it easier to pull the spreader 9 between the outwardly extending ends of the cable 21.

After the spreader 9 has been removed, the wedge halves 8' are free to and will collapse together to the position of FIG. 3. The cable 21 is then freed so that it may relatively easily be pulled clear of the clamp by means, for example, of a winch or tractor.

If desired, and depending on the size and flexibility of the cable involved, the cable can be separated at the notch formed by the cutaway portions 13 before being removed. The notch facilitates the separating operation by exposing the entire cable so that it can be cut or burned through without damage to the clamp. When the cable has been separated, the live and dead ends can be removed separately, which may be advantageous for extremely large or stiff cables.

When a new cable is to be clamped, the wedge 8 and spreader 9 are first reassembled into a single unit. The rims 15 are helpful in this operation since they insure proper orientation of the spreader 9. The new cable is then passed through the small end of the socket 1 and looped about the large end of the wedge 8, which is laid next to the socket 1, and back through the small end of the socket 1. The live end of the cable is then pulled tight to draw the wedge 8 into the socket 1. Once the wedge 8 is in place, the entire clamp can be remounted on the machine.

It will be appreciated that, for the large cables contemplated herein, not all of the foregoing steps can be accomplished by hand. The preferred embodiment shown herein is designed to accept cables up to four inches in diameter and the clamp assembly itself weighs almost 1400 pounds. It will, therefore, be necessary to use a tractor or auxiliary crane to handle the clamp, remove the cable and pull the new cable tight. The total time and effort required, however, are still much less than would be required using prior art devices, and the entire procedure of removal and replacement can be accomplished on the job without transporting the clamp to a shop.

Although a preferred embodiment of the invention has been shown and described herein, it will be obvious that modifications might be made without departure from the invention. The invention is not, therefore, intended to be limited by the showing herein or in any other manner except insofar as limitations appear specifically in the following claims.

I claim:
1. A wedge assembly for a cable clamp comprising: a wedge comprising a pair of wedge halves that are pivotally connected to be movable toward and away from one another; a spreader insertable between the wedge halves to move them apart and removable to allow the wedge halves to move toward one another; and removable lock means to lock the spreader in place between the wedge halves.

2. A wedge assembly according to claim 1 in combination with a sleeve-like socket within which the wedge assembly is receivable, said socket having a side wall provided with a release opening, the inner end of the spreader extending at least partially across the release opening when the spreader is in place to be adapted to be engaged by a release key inserted through said opening.

3. A wedge assembly according to claim 1 wherein at least one of the wedge halves is provided with an upstanding ear that lies alongside the spreader when the spreader is in place; and the ear and spreader are provided with transverse lock pin openings that are in alignment when the spreader is in place; and the lock means comprises a lock pin removably insertable through said lock pin openings.

4. A wedge assembly according to claim 3 wherein the wedge halves are substantially identical with each being provided with an ear, the ears of the two wedge halves each having a transverse lock pin opening, the two ears being laterally and vertically spaced and lying on opposite sides of the spreader when the spreader is in place; and there are two lock pin openings in the spreader that are aligned with respective lock pin openings of the ears when the spreader is in place; and there are two lock pins, one for each set of lock pin openings.

5. A wedge assembly according to claim 4 wherein each ear is provided with a cotter pin bore transverse to and extending across the lock pin opening thereof; and the lock pins are provided with transverse cotter pin openings that are in alignment with the cotter pin bores when the lock pins are in place; and there are two cotter pins that are removably insertable into the cotter pin bores and cotter pin openings.

6. A wedge assembly according to claim 4 wherein the wedge halves are provided with facing inclined wedge surfaces between which the spreader is received; and the inner end of each wedge surface is outlined by a generally U-shaped outwardly opening upstanding rim, the upper and lower surfaces of the spreader being engageable with respective rims to limit inward and lateral movement of the spreader.

7. A wedge assembly according to claim 6 in combination with a sleeve-like socket that is adapted to receive the wedge and that has opposite side walls provided with aligned release openings; the inner end of the spreader being oblique and extending at least partially into the line of the release openings when the spreader is in place so that it is adapted to be engaged by a release key inserted through one of said openings, such engagement causing the spreader to be moved outwardly with respect to the wedge halves.

References Cited
UNITED STATES PATENTS 2,597,626   5/1952   Eder _____ 24—126

FOREIGN PATENTS 216,106   11/1909   Germany.
9,484    4/1913   Great Britain.

BERNARD A. GELAK, *Primary Examiner.*